(12) United States Patent
Harvey et al.

(10) Patent No.: US 6,346,331 B2
(45) Date of Patent: *Feb. 12, 2002

(54) COMPOSITION FOR PROVIDING AN ABRASION RESISTANT COATING ON A SUBSTRATE

(75) Inventors: Janet L. Harvey, La Mirada; Tuan H. Ho, Rancho Santa Margarita; Allen M. Guest, China; Karl W. Terry, Huntington Beach; Mark S. Sollberger, Irvine, all of CA (US)

(73) Assignee: SDC Coatings, Inc., Anaheim, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/031,932

(22) Filed: Feb. 27, 1998

Related U.S. Application Data

(62) Division of application No. 08/840,831, filed on Apr. 17, 1997, now Pat. No. 6,001,163.

(51) Int. Cl.$^7$ .............................. B32B 9/00; B32B 17/06
(52) U.S. Cl. ..................... 428/429; 428/447; 428/450; 428/451; 428/452; 428/540; 428/541
(58) Field of Search ................................ 428/429, 447, 428/450, 451, 540, 541

(56) References Cited

U.S. PATENT DOCUMENTS

| | | | |
|---|---|---|---|
| 3,780,132 A | 12/1973 | Lohr | 523/427 |
| 3,922,440 A | 11/1975 | Wegwerth et al. | 428/437 |
| 4,027,073 A | 5/1977 | Clark | 428/412 |
| 4,081,421 A | 3/1978 | Yoshida et al. | 260/32.8 EP |
| 4,355,135 A | 10/1982 | January | 524/767 |
| 4,390,373 A | 6/1983 | White et al. | 106/287 |
| 4,442,168 A | 4/1984 | White et al. | 428/331 |
| 4,485,130 A | 11/1984 | Lampin et al. | 427/387 |
| 4,594,290 A | 6/1986 | Fischer et al. | 428/212 |
| 4,756,827 A | 7/1988 | Mayer | 210/170 |
| 5,013,788 A | 5/1991 | Nagashima et al. | 524/767 |
| 5,120,811 A | 6/1992 | Glotfelter et al. | 523/25 |
| 5,314,947 A | 5/1994 | Sarawagi | 524/780 |
| 5,316,791 A | 5/1994 | Farber et al. | 427/464 |

FOREIGN PATENT DOCUMENTS

| | | |
|---|---|---|
| CA | 2071692 | 12/1992 |
| DE | 4118826 | 12/1991 |
| DE | 4020316 | 1/1992 |
| EP | 0526975 | 2/1993 |
| WO | WO9516522 | 6/1995 |
| WO | WO9629154 | 9/1996 |

OTHER PUBLICATIONS

Chemical Abstract, vol. 126, No. 1, Jan. 1, 1997, Columbus Ohio, US; Abstract No. 9335, Kato, H., E.A.: "Siloxane coating compositions with improved resistance to abrasion, UV, and heat for plastic optical materials" XP002075220 (see abstract & JP 08 239 627 A (Ito Optical Ind Co. Ltd.).
"Cyclo Epoxide Based Sol–Gel Derived Material," Better Ceramics Through Chemistry VI, Material Search Society Symposium Proceedings, 1994, V. 346, Sigel, Domszy and Welch.
"New Type of a Sol–Gel Derived Inorganic–Organic Nanocomposite," Better Ceramics Through Chemistry VI, Material Search Society Symposium Proceedings, 1994, V. 346, Kasemann, Schmidt and Wintrich.

*Primary Examiner*—D. S. Nakarani
(74) *Attorney, Agent, or Firm*—Dunlap, Codding & Rogers, P.C.

(57) ABSTRACT

Compositions having improved sability which, when applied to a variety of substrates and cured, form transparent coatings having superior abrasion resistant properties. The coating compositions are aqueous-organic solvent mixtures containing a mixture of hydrolysis products and partial condensates of an epoxy functional silane and a tetrafunctional silane and a multifunctional compound selected from the group consisting of multifunctional carboxylic acids, multifunctional anhydrides and combinations thereof.

31 Claims, No Drawings

COMPOSITION FOR PROVIDING AN ABRASION RESISTANT COATING ON A SUBSTRATE

CROSS REFERENCE TO RELATED APPLICATIONS

This application is a divisional application of application U.S. Ser. No. 08/840,831, filed Apr. 17, 1997, entitled "COMPOSITION FOR PROVIDING AN ABRASION RESISTANT COATING ON A SUBSTRATE", now U.S. Pat. No. 6,001,163.

STATEMENT REGARDING FEDERALLY SPONSORED RESEARCH OR DEVELOPMENT

Not Applicable.

BACKGROUND OF THE INVENTION

1. Field of the Invention

The present invention relates to coating compositions, and more particularly but not by way of limitation, to coating compositions which, when cured, provide substantially transparent coatings having enhanced abrasion resistance. In one aspect, the present invention relates to a coating composition having improved stability wherein the coating compositions are derived from aqueous-organic solvent mixtures containing effective amounts of epoxy functional silanes, tetrafunctional silanes and multifunctional compounds such as multifunctional carboxylic acids, multifunctional anhydrides, and mixtures thereof.

2. Description of Prior Art

The prior art is replete with compositions which, when applied to substrates and cured, provide transparent, abrasion resistant coatings for the substrates. Such coatings are especially useful for polymeric substrates where it is highly desirable to provide substrates with abrasion resistant surfaces, with the ultimate goal to provide abrasion resistant surfaces which are comparable to glass. While the compositions of the prior art have provided transparent coating compositions having improved abrasion resistant properties, such prior art compositions are generally lacking when compared to glass. Thus, a need has long existed for improved compositions having improved stability and which, when applied to a substrate, such as a polymeric substrate, and cured provide transparent, highly abrasion resistant coatings. It is to such compositions and processes by which such compositions are manufactured and applied to substrates that the present invention is directed.

BRIEF SUMMARY OF THE INVENTION

The present invention provides compositions having improved stability which, when applied to a variety of substrates and cured, form transparent coatings having superior abrasion resistant properties. Broadly, the coating compositions of the present invention comprise an aqueous-organic solvent mixture containing from about 10 to about 99.9 weight percent, based on the total solids of the composition, of a mixture of hydrolysis products and partial condensates of an epoxy functional silane and a tetrafunctional silane and from about 0.1 to about 30 weight percent, based on the total solids of the composition, of a multifunctional compound selected from the group consisting of multifunctional carboxylic acids, multifunctional anhydrides and combinations thereof. The epoxy functional silane and the tetrafunctional silane are present in the aqueous-organic solvent mixture in a molar ratio of from about 0.1:1 to about 5:1. The coating compositions of the present invention may further include from about 0.1 to about 50 weight percent of a mixture of hydrolysis products and partial condensates of one or more silane additives, based on the total solids of the composition, and/or an amount of colloidal silica or a metal oxide or combinations thereof equivalent to from about 0.1 to about 50 weight percent solids, based on the total solids of the composition.

It is an object of the present invention to provide coating compositions having improved stability which form transparent coatings upon curing. It is a further object of the present invention to provide stable coating compositions which form transparent coatings upon curing having improved abrasion resistance.

Other objects, advantages and features of the present invention will become apparent upon reading the following detailed description in conjunction with the appended claims.

DETAILED DESCRIPTION OF THE INVENTION

The present invention relates to coating compositions having improved stability which, when applied to a variety of substrates and cured, form substantially transparent abrasion resistant coatings having a Bayer number of at least 5 when tested in accordance with the variation of the Oscillating Sand Test (ASTM F735-81) hereinafter described.

For testing abrasion resistance of coated substrates, any of a number of quantitative test methods may be employed, including the Taber Test (ASTM D-4060), the Tumble Test and the Oscillating Sand Test (ASTM F735-81). In addition, there are a number of qualitative test methods that may be used for measuring abrasion resistance, including the Steel Wool Test and the Eraser Test. In the Steel Wool Tests and the Eraser Test, sample coated substrates are scratched under reproducible conditions (constant load, frequency, etc.). The scratched test samples are then compared and rated against standard samples. A semi-quantitative application of these test methods involves the use of an instrument, such as a Spectrophotometer or a Colorimeter, for measuring the scratches on the coated substrate as a haze gain.

The measured abrasion resistance of a cured coating on a substrate, whether measured by the Bayer Test, Taber Test, Steel Wool Test, Eraser Test, Tumble Test, etc. is a function, in part, of the cure temperature and cure time. In general, higher temperatures and longer cure times result in higher measured abrasion resistance. Normally, the cure temperature and cure time are selected for compatibility with the substrate; although, sometimes less than optimum cure temperatures and cure times are used due to process and/or equipment limitations. It will be recognized by those skilled in the art that other variables, such as coating thickness and the nature of the substrate, will also have an effect on the measured abrasion resistance. In general, for each type of substrate and for each coating composition there will be an optimum coating thickness. The optimum cure temperature, cure time, coating thickness, and the like, can be readily determined empirically by those skilled in the art.

Within the Ophthalmic Industry, the Oscillating Sand Test is presently the most widely used and accepted method for measuring abrasion resistance. Since the original ASTM application of the Oscillating Sand Test was for testing flat polymeric sheets, the test method has necessarily been modified for use with ophthalmic lenses. There is currently no ASTM accepted standard (or other industry standard) for this test as applied to ophthalmic lenses; therefore, there are a number of basic variations of the Oscillating Sand Test in practice.

In one particular variation of the Oscillating Sand Test, a sand cradle is modified to accept coated sample lenses and uncoated reference lenses. Typically, poly(diethylene glycol-bis-allyl carbonate) lenses, hereinafter referred to as ADC lenses, are used as the reference lenses. The lenses are positioned in the cradle to allow a bed of abrasive material, either sand or a synthetically prepared metal oxide, to flow back and forth across the lenses, as the cradle oscillates back and forth at a fixed stroke, frequency and duration.

In the test method employed to determine the abrasion resistance of the coating compositions of the present invention, a commercially available sand sold by CGM, Inc., 1463 Ford Road, Bensalem, Pa., was used as the abrasive material. In this test, 877 grams of sifted sand (600 ml by volume) was loaded into a 9 5/16"×6 3/4" cradle fitted with four lenses. The sand was sifted through a #5 Mesh screen (A.S.T.M.E.-11 specification) and collected on a #6 Mesh screen. Each set of four lenses typically two ADC lenses and two coated lenses, was subjected to a 4 inch stroke (the direction of the stroke coinciding with the 9 5/16" length of the cradle) at a frequency of 300 strokes per minute for a total of 3 minutes. The lens cradle was then repositioned by turning 180 degrees and then subjected to another 3 minutes of testing. Repositioning of the cradle was used to reduce the impact of any inconsistencies in the oscillating mechanism. The ADC reference lenses used were Silor 70 mm plano FSV lenses, purchased through Essilor of America, Inc. of St. Petersburg, Fla.

The haze generated on the lenses was then measured on a Gardner XL-835 Colorimeter. The haze gain for each lens was determined as the difference between the initial haze on the lenses and the haze after testing. The ratio of the haze gain on the ADC reference lenses to the haze gain on the coated sample lenses was then reported as the resultant abrasion resistance of the coating material. A ratio of greater than 1 indicates a coating which provides greater abrasion resistance than the uncoated ADC reference lenses. This ratio is commonly referred to as the Bayer ratio, number or value; the higher the Bayer number, the higher the abrasion resistance of the coating. Coatings produced by curing the coating compositions of the present invention, when tested using the Oscillating Sand Test method as described above, coated on either polycarbonate or on ADC lenses, have been shown to provide Bayer numbers which exceed 5. For testing coated samples, samples coated on ADC lenses were cured at a temperature of 120° C. for a period of 3 hours. Samples coated on polycarbonate lenses were cured at a temperature of 129° C. for a period of 4 hours.

One who is skilled in the art will recognize that: (a) The descriptions herein of coating systems which contain epoxy functional silanes, tetrafunctional silanes, silane additives which do not contain an epoxy functional group, and the multifunctional component refer to the incipient silanes and multifunctional components from which the coating system is formed, (b) when the epoxy functional silanes, tetrafunctional silanes, and silane additives which do not contain an epoxy functional group, are combined with the aqueous-solvent mixture, partial or fully hydrolyzed species will result, (c) the resultant fully or partially hydrolyzed species will combine to form mixtures of multifunctional oligomeric siloxane species, (d) these oligomers may or may not contain both pendant hydroxy and pendant alkoxy moieties and will be comprised of a silicon-oxygen matrix which contains both silicon-oxygen siloxane linkages and silicon-oxygen multifunctional component linkages, (e) these are dynamic oligomeric suspensions that undergo structural changes which are dependent upon a multitude of factors including; temperature, pH, water content, catalyst concentration, and the like.

The coating compositions of the present invention comprise an aqueous-organic solvent mixture containing from about 10 to about 99.9 weight percent, based on the total solids of the composition, of a mixture of hydrolysis products and partial condensates of an epoxy functional silane and a tetrafunctional silane and from about 0.1 to about 30 weight percent, based on the total solids of the composition, of a multifunctional compound selected from the group consisting of multifunctional carboxylic acids, multifunctional anhydrides, and combinations thereof. It will be recognized by those skilled in the art that the amount of epoxy functional silane and the amount of tetrafunctional silane employed to provide the mixture of hydrolysis products and partial condensates of the epoxy functional silane and the tetrafunctional silane can vary widely and will generally be dependent upon the properties desired in the coating composition, the coating formed by curing the coating composition, as well as the end use of the substrate to which the coating composition is applied. Generally, however, desirable results can be obtained where the epoxy functional silane and the tetrafunctional silane are present in the aqueous-solvent mixture in a molar ratio of from about 0.1:1 to about 5:1. More desirably, the epoxy functional silane and the tetrafunctional silane are present in the aqueous-solvent mixture in a molar ratio of from about 0.1:1 to about 3:1.

While the presence of water in the aqueous-organic solvent mixture is necessary to form hydrolysis products of the silane components of the mixture, the actual amount can vary widely. Essentially enough water is needed to provide a substantially homogeneous coating mixture of hydrolysis products and partial condensates of the epoxy functional silane and the tetrafunctional silane which, when applied and cured on an article, provides a substantially transparent coating with a Bayer number of at least 5 when using the method hereinbefore described. It will be recognized by those skilled in the art that this amount of water can be determined empirically.

The solvent constituent of the aqueous-organic solvent mixture of the coating compositions of the present invention can be any solvent or combination of solvents which is compatible with the epoxy functional silane, the tetrafunctional silane and the multifunctional component. For example, the solvent constituent of the aqueous-organic solvent mixture may be an alcohol, an ether, a glycol or a glycol ether, a ketone, an ester, a glycolether acetate and mixtures thereof. Suitable alcohols can be represented by the formula ROH where R is an alkyl group containing from 1 to about 10 carbon atoms. Some examples of alcohols useful in the application of this invention are methanol, ethanol, propanol, isopropanol, butanol, isobutanol, secondary butanol, tertiary butanol, cyclohexanol, pentanol, octanol, decanol, and mixtures thereof.

Suitable glycols, ethers, glycol ethers can be represented by the formula $R^1$—$(OR^2)_x$—$OR^1$ where x is 0, 1, 2, 3 or 4, $R^1$ is hydrogen or an alkyl group containing from 1 to about 10 carbon atoms and $R^2$ is an alkylene group containing from 1 to about 10 carbon atoms and combinations thereof.

Examples of glycols, ethers and glycol ethers having the above-defined formula and which may be used as the solvent constituent of the aqueous-organic solvent mixture of the coating compositions of the present invention are di-n-butylether, ethylene glycol dimethyl ether, propylene glycol dimethyl ether, propylene glycol methyl ether, dipropylene glycol methyl ether, tripropylene glycol methyl ether, dipropylene glycol dimethyl ether, tripropylene glycol dimethyl ether, ethylene glycol butyl ether, diethylene glycol butyl ether, ethylene glycol dibutyl ether, ethylene glycol methyl ether, diethylene glycol ethyl ether, diethylene glycol dimethyl ether, ethylene glycol ethyl ether, ethylene glycol diethyl ether, ethylene glycol, diethylene glycol, triethylene glycol, propylene glycol, dipropylene glycol, tripropylene glycol, butylene glycol, dibutylene glycol, tributylene glycol and mixtures thereof. In addition to the above, cyclic ethers such as tetrahydrofuran and dioxane are suitable ethers for the aqueous-organic solvent mixture.

Examples of ketones suitable for the aqueous-organic solvent mixture are acetone, diacetone alcohol, methyl ethyl ketone, cyclohexanone, methyl isobutyl ketone and mixtures thereof.

Examples of esters suitable for the aqueous-organic solvent mixture are ethyl acetate, n-propyl acetate, n-butyl acetate and combinations thereof.

Examples of glycolether acetates suitable for the aqueous-organic solvent mixture are propylene glycol methyl ether acetate, dipropylene glycol methyl ether acetate, ethyl 3-ethoxypropionate, ethylene glycol ethyl ether acetate and combinations thereof.

The epoxy functional silane useful in the formulation of the coating compositions of the present invention can be any epoxy functional silane which is compatible with the tetrafunctional silane and the multifunctional component of the coating composition and which provides a coating composition which, upon curing, produces a substantially transparent, abrasion resistant coating having a Bayer number of at least about 5 when employing the test method hereinbefore described. Generally, such epoxy functional silanes are represented by the formula $R^3_x Si(OR^4)_{4-x}$ where x is an integer of 1, 2 or 3, $R^3$ is H, an alkyl group, a functionalized alkyl group, an alkylene group, an aryl group, an alkyl ether, and combinations thereof containing from 1 to about 10 carbon atoms and having at least 1 epoxy functional group, and $R^4$ is H, an alkyl group containing from 1 to about 5 carbon atoms, an acetyl group, a —Si$(OR^5)_{3-y}R^6_y$ group where y is an integer of 0, 1, 2, or 3, and combinations thereof where $R^5$ is H, an alkyl group containing from 1 to about 5 carbon atoms, an acetyl group, or another —Si$(OR^5)_{3-y}R^6_y$ group and combinations thereof, and $R^6$ is H, an alkyl group, a functionalized alkyl group, an alkylene group, an aryl group, an alkyl ether, and combinations thereof containing from 1 to about 10 carbon atoms which may also contain an epoxy functional group.

Examples of such epoxy functional silanes are glycidoxymethyltrimethoxysilane, 3-glycidoxypropyltrihydroxysilane, 3-glycidoxypropyldimethylhydroxysilane, 3-glycidoxypropyltrimethoxysilane, 3-glycidoxypropyltriethoxysilane, 3-glycidoxypropyldimethoxymethylsilane, 3-glycidoxypropyldimethylmethoxysilane, 3-glycidoxypropyltributoxysilane, 1,3-bis(glycidoxypropyl) tetramethyldisiloxane, 1,3-bis(glycidoxypropyl) tetramethoxydisiloxane, 1,3-bis(glycidoxypropyl)-1,3-dimethyl-1,3-dimethoxydisiloxane, 2,3-epoxypropyltrimethoxysilane, 3,4-epoxybutyltrimethoxysilane, 6,7-epoxyheptyltrimethoxysilane, 9,10-epoxydecyltrimethoxysilane, 1,3-bis(2,3-epoxypropyl) tetramethoxydisiloxane, 1,3-bis(6,7-epoxyheptyl) tetramethoxydisiloxane, 2-(3,4-epoxycyclohexyl) ethyltrimethoxysilane, and the like.

The tetrafunctional silanes useful in the formulation of the coating compositions of the present invention are represented by the formula $Si(OR^7)_4$ where $R^7$ is H, an alkyl group containing from 1 to about 5 carbon atoms and ethers thereof, an $(OR^7)$ carboxylate a —Si$(OR^8)_3$ group where $R^8$ is a H, an alkyl group containing from 1 to about 5 carbon atoms and ethers thereof, an $(OR^3$ carboxylate or another —Si$(OR^8)_3$ group and combinations thereof. Examples of tetrafunctional silanes represented by the formula $Si(OR^7)_4$ are tetramethyl orthosilicate, tetraethyl orthosilicate, tetrapropyl orthosilicate, tetraisopropyl orthosilicate, tetrabutyl orthosilicate, tetraisobutyl orthosilicate, tetrakis (methoxyethoxy)silane, tetrakis(methoxypropoxy)silane, tetrakis(ethoxyethoxy)silane, tetrakis(methoxyethoxyethoxy)silane, trimethoxyethoxysilane, dimethoxydiethoxysilane, triethoxymethoxysilane, poly (dimethoxysiloxane), poly(diethoxysiloxane), poly (dimethoxydiethoxysiloxane), tetrakis(trimethoxysiloxy) silane, tetrakis(triethoxysiloxy)silane, and the like. In addition to the $R^7$ and $R^8$ substituants described above for the tetrafunctional silane, $R^7$ and $R^8$ taken with oxygen $(OR^7)$ and $(OR^8)$ can be carboxylate groups. Examples of tetrafunctional silanes with carboxylate functionalities are silicon tetracetate, silicon tetrapropionate and silicon tetrabutyrate.

The multifunctional compounds which can be employed in the formulation of the coating compositions of the present invention can be any multifunctional carboxylic acid, multifunctional anhydride and combinations thereof which is compatible with the epoxy functional silane and the tetrafunctional silans of the coating compositions and which is capable of interacting with the hydrolysis products and partial condensates of the epoxy functional silane and the tetrafunctional silane to provide a coating composition which, upon curing, produces a substantially transparent, abrasion resistant coating having a Bayer number of at least 5 when employing the test method hereinbefore described.

Examples of multifunctional carboxylic acids which can be employed as the multifunctional compound in the compositions of the present invention include malic acid, aconitic acid (cis,trans), itaconic acid, succinic acid, malonic acid, glutaric acid, adipic acid, pimelic acid, suberic acid, azelaic acid, sebacic acid, cyclohexyl succinic acid, 1,3,5 benzene tricarboxylic acid, 1,2,4,5 benzene tetracarboxylic acid, 1,4-cyclohexanedicarboxylic acid, 1,3-cyclohexanedicarboxylic acid, 1,1-cyclohexanediacetic acid, 1,3-cyclohexanediacetic acid, 1,3,5-cyclohexanetricarboxylic acid and unsaturated dibasic acids such as fumaric acid and maleic acid and combinations thereof.

Examples of multifunctional anhydrides which can be employed as the multifunctional compound in the coating compositions of the present invention include the cyclic anhydrides of the above mentioned dibasic acids such as succinic anhydride, itaconic anhydride, glutaric anhydride, trimellitic anhydride, pyromellitic anhydride, phthalic anhydride and maleic anhydride and combinations thereof.

The nature of the interaction between the epoxy functional silane, the tetrafunctional silane and the multifunctional compound, and the effect that such interaction has on the abrasion resistance of the cured coating is not fully understood. It is believed, however, that the multifunctional compound acts as more than just a hydrolysis catalyst for the silanes. In this regard, it can be proposed that the multifunctional compound has specific activity towards the epoxy functionality on the silane. The reaction of the epoxy groups with carboxylic acids is well known and can occur under either acidic or basic conditions. The carboxylate groups on the multifunctional compound will also most likely have some activity towards the silicon atoms in the matrix; and such interaction may be through normal exchange reactions with residual alkoxide and hydroxide groups or, alternatively, through some hypervalent state on the silicon atoms. The actual interaction involving the multifunctional compound may, in fact, be a combination of all of the above possibilities, the result of which would be a highly crosslinked matrix. Thus, the matrix is enhanced through extended linkages involving the multifunctional compound.

As examples of the significance of these possible interactions, coatings prepared with non-multifunctional compounds, for example acetic acid, fail to show the same high degree of stability and abrasion resistance as obtained through the use of the multifunctional compounds. In this case, a non-multifunctional acid would have the same utility in the coating composition as a hydrolysis catalyst for the silanes, but could not provide the extended linkages presumed to be possible with the multifunctional compounds.

The coating compositions of the present invention are also very stable with respect to aging, both in terms of performance and solution stability. The aging of the coating compositions is characterized by a gradual increase in viscosity which eventually renders the coating compositions unusable due to processing constraints. Aging studies have shown that the coating compositions of the present invention, when stored at temperatures of 5° C. or lower, have usable shelf lives of 3–4 months. During this period, the abrasion resistance of the cured coatings does not significantly decrease with time. Further, such studies have shown that stability of the coating compositions is dependent on the relative concentrations of the epoxy functional silane, the tetrafunctional silane and the multifunctional compound. In general, higher concentrations of the epoxy functional silane and the multifunctional compound contribute to increased stability of the coating mixture. Thus, in addition to providing enhanced abrasion resistance to the cured coatings, the multifunctional compound contributes to the overall stability of the coating compositions.

While the coating compositions produced by the unique combination of an epoxy functional silane, a tetrafunctional silane and a multifunctional compound provide the primary basis for the high abrasion resistance of coatings prepared by curing such coating compositions, the coating compositions may additionally include other materials to: (a) enhance the stability of the coating compositions; (b) increase the abrasion resistance of cured coatings produced by the coating compositions; (c) enhance processing of the coating compositions; and (d) provide other desirable properties of the cured coating produced from the coating compositions.

The coating compositions of the present invention may further include from about 0.1 to about 50 weight percent, based on the weight of total solids of the coating compositions, of a mixture of hydrolysis products and partial condensates of one or more silane additives (i.e, trifunctional silanes, difunctional silanes, monofunctional silanes, and mixtures thereof. The silane additives which can be incorporated into the coating compositions of the present invention have the formula $R^9_x Si(OR^{10})_{4-x}$ where x is a number of 1, 2 or 3; $R^9$ is H, or an alkyl group containing from 1 to about 10 carbon atoms, a functionalized alkyl group, an alkylene group, an aryl group an alky ether group and combinations thereof; $R^{10}$ is H, an alkyl group containing from 1 to about 10 carbon atoms, an acetyl group; and combinations thereof. Examples of silane additives represented by the above-defined formula are methyltrimethoxysilane, ethyltrimethoxysilane, propyltrimethoxysilane, butyltrimethoxysilane, isobutyltrimethoxysilane, hexyltrimethoxysilane, octyltrimethoxysilane, decyltrimethoxysilane, cyclohexyltrimethoxysilane, cyclohexylmethyltrimethoxysilane, 3-methacryloxypropyltrimethoxysilane, vinyltrimethoxysilane, allyltrimethoxysilane, dimethyldimethoxysilane, 2-(3-cyclohexenyl) ethyltrimethoxysilane, 3-cyanopropyltrimethoxysilane, 3-chloropropyltrimethoxysilane, 2-chloroethyltrimethoxysilane, phenethyltrimethoxysilane, 3-mercaptopropyltrimethoxysilane, 3-aminopropyltrimethoxysilane, phenyltrimethoxysilane, 3-isocyanopropyltrimethoxysilane, N-(2-aminoethyl)-3-aminopropyltrimethoxysilane, 4-(2-aminoethylaminomethyl)phenethyltrimethoxysilane, chloromethyltriethoxysilane, 2-chloroethyltriethoxysilane, 3-chloropropyltriethoxysilane, phenyltriethoxysilane, ethyltriethoxysilane, propyltriethoxysilane, butyltriethoxysilane, isobutyltriethoxysilane, hexyltriethoxysilane, octyltriethoxysilane, decyltriethoxysilane, cyclohexyltriethoxysilane, cyclohexylmethyltriethoxysilane, 3-methacryloxypropyltriethoxysilane, vinyltriethoxysilane, allyltriethoxysilane, [2-(3-cyclohexenyl) ethyltriethoxysilane, 3-cyanopropyltriethoxysilane, 3-methacrylamidopropyltriethoxysilane, 3-methoxypropyltrimethoxysilane, 3-ethoxypropyltrimethoxysilane, 3-propoxypropyltrimethoxysilane, 3-methoxyethyltrimethoxysilane, 3-ethoxyethyltrimethoxysilane, 3-propoxyethyltrimethoxysilane, 2-[methoxy (polyethyleneoxy)propyl]heptamethyltrisiloxane, [methoxy (polyethyleneoxy)propyl]trimethoxysilane, [methoxy (polyethyleneoxy)ethyl]trimethoxysilane, [methoxy (polyethyleneoxy)propyl]-triethoxysilane, [methoxy (polyethyleneoxy)ethyl]triethoxysilane.

The selection of the silane additive, as well as the amount of such silane additive incorporated into the coating compositions will depend upon the particular properties to be enhanced or imparted to either the coating composition or the cured coating composition. For example, when the difunctional silane dimethyldimethoxysilane is utilized as the silane additive and incorporated into the coating composition in an amount of about 10% or less, based on the total solids of the composition, the viscosity increase is greatly reduced during aging of the coating composition, without greatly affecting the resultant abrasion resistance of the cured coating.

In certain applications, it is useful to add colloidal silica to the coating composition. Colloidal silica is commercially available under a number of different tradename designations, including Nalcoag® (Nalco Chemical Co., Naperville, Ill.); Nyacol® (Nyacol Products, Inc., Ashland, Md.); Snowtex® (Nissan Chemical Industries, LTD., Tokyo, Japan); Ludox® (DuPont Company, Wilmington, Del.); and Highlink OG® (Hoechst Celanese, Charlotte, N.C.). The colloidal silica is an aqueous or organic solvent dispersion of particulate silica and the various products differ principally by particle size, silica concentration, pH, presence of stabilizing ions, solvent makeup, and the like. It is understood by those skilled in the art that substantially different product properties can be obtained through the selection of different colloidal silicas.

Colloidal silica, when added to a coating composition, is considered a reactive material. The surface of the silica is covered with silicon bound hydroxyls, some of which are deprotonated, which can interact with materials in the coating composition. The extent of these interactions is dictated by a variety of factors, including solvent system, pH, concentration, and ionic strength. The manufacturing process further affects these interactions. It is thus recognized by those skilled in the art, that colloidal silica can be added into a coating formulation in different ways with different results.

In the coating compositions of the present invention, colloidal silica can be added into the coating compositions in a variety of different ways. In some instances, it is desirable to add the colloidal silica in the last step of the reaction sequence. In other instances, colloidal silica is added in the first step of the reaction sequence. In yet other instances, colloidal silica can be added in an intermediate step in the sequence.

It has been observed that the addition of colloidal silica to the coating compositions of the present invention can further enhance the abrasion resistance of the cured coating compositions and can further contribute to the overall stability of the coating compositions. The most significant results have been achieved with the use of aqueous basic colloidal silica, that is, aqueous mixtures of colloidal silica having a pH greater than 7. In such cases, the high pH is accompanied by a higher concentration of a stabilizing counterion, such as the sodium cation. Cured coatings formulated from the coating compositions of the present invention which contain basic colloidal silicas have shown abrasion resistance comparable to those of a catalyzed coating composition of the present invention (that is, a composition of hydrolysis products and partial condensates of an epoxy functional silane, a tetrafunctional silane, a multi-functional compound and a catalyst such as sodium hydroxide), but the coating compositions containing colloidal silica have enhanced stability with respect to the catalyzed compositions which do not contain colloidal silica.

In the same manner, it is also possible to add other metal oxides into the coating compositions of the present invention. Such additions may be made instead of, or in addition to, any colloidal silica additions. Metal oxides may be added to the inventive coatings to provide or enhance specific properties of the cured coating, such as abrasion resistance, refractive index, anti-static, anti-reflectance, weatherability, etc. It will be recognized by those skilled in the art that similar types of considerations that apply to the colloidal silica additions will also apply more generally to the metal oxide additions.

Examples of metal oxides which may be used in the coating compositions of the present invention include silica, zirconia, titania, ceria, tin oxide and mixtures thereof.

The amount of colloidal silica incorporated into the coating compositions of the present invention can vary widely and will generally depend on the desired properties of the cured coating produced from the coating compositions, as well as the desired stability of the coating compositions. Similarly, the amount of metal oxides incorporated into the coating compositions of the present invention can vary widely and will generally depend on the desired properties of the cured coating produced from the coating compositions, as well as the desired stability of the coating compositions.

When colloidal silica and/or metal oxides are added, it is desirable to add from about 0.1 to about 50 weight percent of solids of the colloidal silica and/or metal oxides, based on the total solids of the composition, to the coating compositions of the present invention. The colloidal silica and/or metal oxides will generally have a particle size in the range of 2 to 150 millimicrons in diameter, and more desirably, a particle size in the range of from about 2 to 50 millimicrons.

Although a catalyst is not an essential ingredient of the present invention, the addition of a catalyst can affect abrasion resistance and other properties of the coating including stability, tinting capacity, porosity, cosmetics, caustic resistance, water resistance and the like. The amount of catalyst used can vary widely, but when present will generally be in an amount sufficient to provide from about 0.1 to about 10 weight percent, based on the total solids of the composition.

Examples of catalysts which can be incorporated into the coating compositions of the present invention are (i) metal acetylacetonates, (ii) diamides, (iii) imidazoles, (iv) amines and ammonium salts, (v) organic sulfonic acids and their amine salts, (vi) alkali metal salts of carboxylic acids, (vii) alkali metal hydroxides and (viii) fluoride salts. Thus, examples of such catalysts include for group (i) such compounds as aluminum, zinc, iron and cobalt acetylacetonates; group (ii) dicyandiamide; for group (iii) such compounds as 2-methylimidazole, 2-ethyl-4-methylimidazole and 1-cyanoethyl-2-propylimidazole; for group (iv), such compounds as benzyldimethylamine, and 1,2-diaminocyclohexane; for group (v), such compounds as trifluoromethanesulfonic acid; for group (vi), such compounds as sodium acetate, for group (vii), such compounds as sodium hydroxide, and potassium hydroxide; and for group (viii), tetra n-butyl ammonium fluoride, and the like.

An effective amount of a leveling or flow control agent can be incorporated into the composition to more evenly spread or level the composition on the surface of the substrate and to provide substantially uniform contact with the substrate. The amount of the leveling or flow control agent can vary widely, but generally is an amount sufficient to provide the coating composition with from about 10 to about 5,000 ppm of the leveling or flow control agent. Any conventional, commercially available leveling or flow control agent which is compatible with the coating composition and the substrate and which is capable of leveling the coating composition on a substrate and which enhances wetting between the coating composition and the substrate can be employed. The use of leveling and flow control agents is well known in the art and has been described in the "Handbook of Coating Additives" (ed. Leonard J. Calbo, pub. Marcel Dekker), pg 119–145.

Examples of such leveling or flow control agents which can be incorporated into the coating compositions of the present invention include organic polyethers such as TRITON X-100, X-405, N-57 from Rohm and Haas, silicones such as Paint Additive 3, Paint Additive 29, Paint Additive 57 from Dow Corning, SILWET L-77, and SILWET L-7600 from OSi Specialties, and fluorosurfactants such as FLUORAD FC-171, FLUORAD FC-430 and FLUORAD FC-431 from 3M Corporation.

In addition, other additives can be added to the coating compositions of the present invention in order to enhance the usefulness of the coating compositions or the coatings produced by curing the coating compositions. For example, ultraviolet absorbers, antioxidants, and the like can be incorporated into the coating compositions of the present invention, if desired.

The coating compositions of the present invention can be prepared by a variety of processes to provide stable coating compositions which, upon curing, produce substantially transparent coatings having enhanced abrasion resistance.

For example, the epoxy functional silane, the tetrafunctional silane and the multifunctional compound can be added to the aqueous-organic solvent solution and stirred for a period of time effective to produce a coating composition having improved stability. When cured, such coating compositions have Bayer numbers ranging from about 6 to about 8 when employing the test method hereinbefore described. However, by incorporating a catalyst into the aqueous-organic solvent mixtures containing the epoxy functional silane, the tetrafunctional silane and the multifunctional compound, the Bayer numbers of the cured coatings produced from such coating compositions are increased so as to range from about 8 to about 15 when employing the test method hereinbefore described.

When an aqueous hydrolyzate of the epoxy functional silane is mixed with a solution of the multifunctional compound and combined with the tetrafunctional silane a coating composition is formed which when cured has a Bayer value of about 7 when employing the test method herein before described.

When a tetrafunctional silane hydrolyzate is formed in the presence of the multifunctional compound or other acid and the aqueous-organic mixture, and the epoxy functional component is added to this mixture, a coating composition is obtained which when cured provides a Bayer value of about 7 when employing the test method herein before described.

When a mixture of the tetrafunctional silane and the multifunctional compound is hydrolyzed and treated with an effective amount of sodium hydroxide and then admixed with an aqueous hydrolyzate of the epoxy functional silane, the resulting cured coating composition has a Bayer value of about 14 when employing the test method herein before described.

From the above, it becomes clear to those skilled in the art that various methods can be employed for producing the coating compositions of the present invention, and that such compositions, when cured, provide coatings having improved abrasion resistance. Further, the coating compositions have a desired stability which enhances their usefulness. However, by altering the method of preparing such compositions, product properties, such as stability and abrasion resistance, i.e., Bayer number, can be affected.

The compositions of the invention can be applied to solid substrates by conventional methods, such as flow coating, spray coating, curtain coating, dip coating, spin coating, roll coating, etc. to form a continuous surface film. Any substrate compatible with the compositions can be coated with the compositions, such as plastic materials, wood, paper, metal, printed surfaces, leather, glass, ceramics, glass ceramics, mineral based materials and textiles. The compositions are especially useful as coatings for synthetic organic polymeric substrates in sheet or film form, such as acrylic polymers, poly(ethyleneterephthalate), polycarbonates, polyamides, polyimides, copolymers of acrylonitrile-styrene, styrene-acrylonitrile-butadiene copolymers, polyvinyl chloride, butyrates, polyethylene and the like. Transparent polymeric materials coated with these compositions are useful as flat or curved enclosures, such as windows, skylights and windshields, especially for transportation equipment. Plastic lenses, such as acrylic or polycarbonate ophthalmic lenses, can also be coated with the compositions of the invention.

By choice of proper formulation, application conditions and pretreatment (including the use of primers) of the substrate, the coating compositions of the present invention can be adhered to substantially all solid surfaces. Abrasion resistant coatings having Bayer numbers of at least 5 employing the test method hereinbefore described can be obtained by heat curing at temperatures in the range of 50° C. to 200° C. for a period of from about 5 minutes to 18 hours. The coating thickness can be varied by means of the particular application technique, but coatings having a thickness of from about 0.5 to 20 microns, and more desirably from about 1–10 microns, are generally utilized.

In order to further illustrate the present invention, the following examples are given. However, it is to be understood that the examples are for illustrative purposes only and are not to be construed as limiting the scope of the subject invention The abrasion resistant properties of the coatings produced by curing the coating compositions prepared in accordance with the following examples were determined using the modification of the Oscillating Sand Test method (ASTM F735-81) hereinbefore described.

EXAMPLES

Procedures

A. Etched poly(diethylene glycol-bis-allyl carbonate) lenses (referred to as ADC lenses) were used for coating and testing. The ADC lenses were etched by contact with a 10% potassium hydroxide solution containing propylene glycol methyl ether and water for a period of about 10 minutes. The propylene glycol methyl ether and water were present in the potassium hydroxide solution in a 1:1 volume ratio. The coating of the lenses with the coating compositions was achieved by dip coating the etched lenses at a withdrawal rate of 6 inches per minute. The coated lenses were then cured at 120° C. for 3 hours. The lenses were tested using the variation of the Oscillating Sand Test method hereinbefore described and a Bayer number was determined for each coating.

B. Primed polycarbonate lenses (referred to as PC lenses) were used for coating and testing. The PC lenses were primed with SDC Primer XF-1107 (commercially available from SDC Coatings, Inc., Anaheim, Calif.) using a withdrawal rate of 2 inches per minute followed by a 30 minute air dry to provide about a 0.5 micron prime coat. The coating of the lenses with the coating compositions was achieved by dip coating the primed lenses at a withdrawal rate of 18 inches per minute. The coated lenses were then cured at 130° C. for 4 hours. The lenses were tested using the variation of the Oscillating Sand Test method hereinbefore described and a Bayer number was determined for each coating.

Example 1A 464 grams of 3-glycidoxypropyltrimethoxysilane were added slowly to 767 grams of deionized water while stirring. The aqueous 3-glycidoxypropyltrimethoxysilane mixture was stirred for approximately one hour. 69.6 grams of itaconic acid dissolved in 767 grams of propylene glycol methyl ether were then added streamwise to the aqueous 3-glycidoxypropyltrimethoxysilane mixture. The mixture was then stirred for 30 minutes, and then 1021 grams of tetraethyl orthosilicate were slowly added to provide a resulting admixture which was stirred overnight to produce a coating composition.

The coating composition was applied to the etched ADC lenses according to Procedure A to provide a cured coating having a thickness of about 2.1 microns. The coated lenses were then subjected to the modified Oscillating Sand Test method hereinbefore described and it was determined that the etched ADC lenses coated with the coating compositions prepared employing the procedures set forth in this Example had a Bayer number of about 6.7.

Example 1B 380 grams of the coating composition from Example 1A were treated with 0.9 grams of benzyldimethylamine and stirred for about 2 hours to produce a coating composition.

The coating composition was applied to the etched ADC lenses according to Procedure A to provide a cured coating having a thickness of about 2.3 microns. The coated lenses were then subjected to the modified Oscillating Sand Test method hereinbefore described and it was determined that the etched ADC lenses coated with the coating compositions prepared employing the procedures set forth in this Example had a Bayer number of about 8.3.

Example 1C 380 grams of the coating composition from Example 1A were treated with 1.2 grams of a 19% aqueous solution of sodium hydroxide to produce a coating composition.

The coating composition was applied to the etched ADC lenses according to Procedure A to provide a cured coating having a thickness of about 2.4 microns. The coated lenses were then subjected to the modified Oscillating Sand Test method hereinbefore described and it was determined that the etched ADC lenses coated with the coating compositions prepared employing the procedures set forth in this Example had a Bayer number of about 10.5.

Examples 1B–1C illustrate the optional use of a catalyst with the coating composition of Example 1A wherein the abrasion resistance is improved when a catalyst is incorporated into the coating composition.

Example 2A

A) 496 grams of 3-glycidoxypropyltrimethoxysilane were added to 820 grams of deionized water. The aqueous 3-glycidoxypropyltrimethoxysilane mixture was stirred for approximately one hour.

B) 200 grams of propylene glycol methyl ether and 18.2 grams of glutaric acid were added to 319 grams of the aqueous 3-glycidoxypropyltrimethoxysilane mixture from step A above and stirred for approximately 15 minutes to produce an admixture. 264.5 grams of tetraethyl orthosilicate were added to this admixture and stirred approximately 17 hours to produce a coating composition.

The coating composition was applied to the etched ADC lenses according to Procedure A to provide a cured coating having a thickness of about 2.1 micron. The coated lenses were then subjected to the modified Oscillating Sand Test method hereinbefore described and it was determined that the etched ADC lenses coated with the coating compositions prepared employing the procedures set forth in this Example had a Bayer number of about 7.9.

Example 2B 400 grams of the coating composition from Example 2A were treated with 0.9 grams of benzyldimethylamine and stirred about 6 hours to produce a coating composition.

The coating composition was applied to the etched ADC lenses according to Procedure A to provide a cured coating having a thickness of about 2.1 microns. The coated lenses were then subjected to the modified Oscillating Sand Test method hereinbefore described and it was determined that the etched ADC lenses coated with the coating compositions prepared employing the procedures set forth in this Example had a Bayer number of about 12.2.

Example 3A 200 grams of propylene glycol methyl ether and 13.7 grams of succinic anhydride were added to 319 grams of the aqueous 3-glycidoxypropyltrimethoxysilane mixture (Step A) of Example 2A and allowed to stir for approximately 15 minutes to produce an admixture. 264.5 grams of tetraethyl orthosilicate were added to the admixture and stirred for approximately 17 hours to produce a coating composition.

The coating composition was applied to the etched ADC lenses according to Procedure A to provide a cured coating having a thickness of about 2.1 microns. The coated lenses were then subjected to the modified Oscillating Sand Test method hereinbefore described and it was determined that the etched ADC lenses coated with the coating compositions prepared employing the procedures set forth in this Example had a Bayer number of about 6.2.

Example 3B 400 grams of the coating composition from Example 3A were treated with 0.9 grams of benzyldimethylamine and stirred for approximately 6 hours to produce a coating composition.

The coating composition was applied to the etched ADC lenses according to Procedure A to provide a cured coating having a thickness of about 2.1 microns. The coated lenses were then subjected to the modified Oscillating Sand Test method hereinbefore described and it was determined that the etched ADC lenses coated with the coating compositions prepared employing the procedures set forth in this Example had a Bayer number of about 14.4.

Example 4A Comparative Example 116 grams of 3-glycidoxypropyltrimethoxysilane were added slowly to 191.8 grams of deionized water. The aqueous 3-glycidoxypropyltrimethoxysilane mixture was then stirred for approximately one hour. 16 grams of acetic acid in 191.8 grams of propylene glycol methyl ether were then added streamwise to the aqueous 3-glycidoxypropyltrimethoxysilane mixture. The mixture was then stirred for 15 minutes, and 255.3 grams of tetraethyl orthosilicate were slowly added to provide a resulting admixture which was stirred approximately 17 hours to produce a coating composition.

The coating composition was applied to the etched ADC lenses according to Procedure A to provide a cured coating having a thickness of about 2.1 microns. The coated lenses were then subjected to the modified Oscillating Sand Test method hereinbefore described and it was determined that the etched ADC lenses coated with the coating compositions prepared employing the procedures set forth in this Example had a Bayer number of about 4.4.

Example 4 in contrast with Examples 1A, 2A, and 3A shows the importance of the multifunctional compound with respect to obtaining Bayer numbers of at least 5 when such coating compositions are tested using the modified Oscillating Sand Test method hereinbefore described.

Example 5

378 grams of 3-glycidoxypropyltrimethoxysilane were added to 653 grams of deionized water and stirred for about 18 hours. 30.8 grams of a 12 weight percent solution of itaconic acid in propylene glycol methyl ether were added to 98.5 grams of the aqueous 3-glycidoxypropyltrimethoxysilane mixture with stirring. 100.8 grams of tetra-n-propyl orthosilicate were then added. The mixture was stirred 12 hours and 19 grams of propylene glycol methyl ether were added to produce a coating composition. The coating composition was aged 7 days at 5° C.

The coating composition was applied to the etched ADC lenses according to Procedure A to provide a cured coating having a thickness of about 2.1 microns. The coated lenses were then subjected to the modified Oscillating Sand Test method hereinbefore described and it was determined that the etched ADC lenses coated with the coating compositions prepared employing the procedures set forth in this Example had a Bayer number of about 8.6.

Example 5 illustrates the use of a tetrafunctional silane other than tetraethyl orthosilicate and shows the generality of the present invention with respect to the tetrafunctional silane.

Example 6A Comparative Example 116 grams of 3-glycidoxypropyltrimethoxysilane were added to 191.8 grams of deionized water. The aqueous 3-glycidoxypropyltrimethoxysilane mixture was stirred for approximately 1 hour. 17.4 grams of itaconic acid in 191.8 grams of propylene glycol methyl ether were added streamwise and stirred approximately 15 minutes to form an admixture. 216.6 grams of Nalco N-1042 colloidal silica were added and stirred approximately 17 hours to form a coating composition.

The coating composition was applied to the etched ADC lenses according to Procedure A to provide a cured coating having a thickness of about 2 microns. The coated lenses were then subjected to the modified Oscillating Sand Test method hereinbefore described and it was determined that the etched ADC lenses coated with the coating composition prepared employing the procedures set forth in this Example had a Bayer number of about 3.0.

Example 6B Comparative Example 0.9 grams of benzyldimethylamine were added to 380 grams of the coating composition of Example 6A and allowed to stir for about 2 hours to form a coating composition.

The coating composition was applied to the etched ADC lenses according to Procedure A to provide a cured coating having a thickness of about 2 microns. The coated lenses were then subjected to the modified Oscillating Sand Test method hereinbefore described and it was determined that the etched ADC lenses coated with the coating composition prepared employing the procedures set forth in this Example had a Bayer number of about 2.4.

Examples 6A and 6B illustrate the importance of the presence of the tetrafunctional silane in the coating compositions of the present invention with respect to obtaining Bayer numbers of at least 5 on the cured coating when such coating compositions are tested using the modified Oscillating Sand Test method hereinbefore described.

Example 7

118.5 grams of tetraethyl orthosilicate were added dropwise to 9.1 grams of itaconic acid, 100.9 grams of water and 100.9 grams of propylene glycol methyl ether, which were being stirred, to form an aqueous-organic solvent mixture. The aqueous-organic solvent mixture was stirred for four hours. 67.2 grams of 3-glycidoxypropyltrimethoxysilane were added dropwise and stirred about 14 hours to form an admixture. 0.03 grams of a silicone leveling agent (PA-57 from Dow Corning, Midland, Mich.) in 0.27 grams of propylene glycol methyl ether were added to form a coating composition.

The coating composition was applied to primed PC lenses according to Procedure B to provide a cured coating. The coated lenses were then subjected to the modified Oscillating Sand Test method hereinbefore described and it was determined that the primed PC lenses coated with the coating compositions prepared employing the procedures set forth in this Example had a Bayer number of about 6.4.

Example 8

86.1 grams of tetraethyl orthosilicate were added dropwise to 10.6 grams of itaconic acid, 112.5 grams of water and 112.5 grams of propylene glycol methyl ether which were being stirred to form an aqueous-organic solvent mixture. The aqueous-organic solvent mixture was stirred for four hours. 78.3 grams of 3-glycidoxypropyltrimethoxysilane were added dropwise and stirred about 14 hours to form an admixture. 0.03 grams of a silicon leveling agent (PA-57) in 0.27 grams of propylene glycol methyl ether were added to form a coating composition.

The coating composition was applied to the primed PC lenses according to Procedure B to provide a coating having a thickness of about 5.3 microns. The coated lenses were then subjected to the modified Oscillating Sand Test method hereinbefore described and it was determined that the primed PC lenses coated with the coating compositions prepared employing the procedures set forth in this Example had a Bayer number of about 5.3.

Example 9

74.8 grams of tetraethyl orthosilicate were added dropwise to 9.1 grams of itaconic acid, 114.6 grams of water and 114.6 grams of propylene glycol methyl ether which were being stirred to form an aqueous-organic solvent mixture. The aqueous-organic solvent mixture was stirred for four hours. 84.8 grams of 3-glycidoxypropyltrimethoxysilane were added dropwise and stirred about 14 hours to form an admixture. 0.03 grams of a silicone leveling agent (PA-57) in 0.27 grams of propylene glycol methyl ether were added to form a coating composition.

The coating composition was applied to the primed PC lenses according to Procedure B to provide a cured coating. The coated lenses were then subjected to the modified Oscillating Sand Test method hereinbefore described and it was determined that the primed PC lenses coated with the coating compositions prepared employing the procedures set forth in this Example had a Bayer number of about 5.4.

The following Examples 10A–12E illustrate process variations which can be employed in the formulation of the compositions of the present invention having improved abrasion-resistance.

Example 10A 116.0 grams of 3-glycidoxypropyltrimethoxysilane, 255.3 grams of tetraethyl orthosilicate, 17.4 grams of itaconic acid and 191.8 grams of propylene glycol methyl ether were combined while being stirred into a single mix. 191.8 grams of water were added to make a resulting mixture. The mixture was then stirred for 17 hours to produce a coating composition.

The coating composition was applied to the etched ADC lenses according to Procedure A to provide a cured coating having a thickness of about 2.1 microns. The coated lenses were then subjected to the modified Oscillating Sand Test method hereinbefore described and it was determined that the etched ADC lenses coated with the coating composition prepared employing the procedures set forth in this Example had a Bayer number of about 7.5.

Example 10B 0.9 grams of benzyldimethylamine were added to 380 grams of the coating composition of Example 10A and stirred for about 6 hours.

The coating composition was applied to the etched ADC lenses according to Procedure A to provide a cured coating having a thickness of about 2.1 microns. The coated lenses were then subjected to the modified Oscillating Sand Test method hereinbefore described and it was determined that the etched ADC lenses coated with the coating composition prepared employing the procedures set forth in this Example had a Bayer number of about 10.7.

Example 11

45.4 grams of itaconic acid, 723.1 grams of propylene glycol methyl ether were combined with stirring to form a resulting mixture. 375.4 grams of deionized water were then added to form an aqueous-organic solvent admixture. 726.1 grams of tetraethyl orthosilicate were added to the admixture and stirred 24 hours. 329.6 grams of 3-glycidoxypropyltrimethoxysilane were then added to produce a coating composition.

The coating composition was applied to the etched ADC lenses according to Procedure A to provide a cured coating having a thickness of about 1.5 microns. The coated lenses were then subjected to the modified Oscillating Sand Test method hereinbefore described and it was determined that the etched ADC lenses coated with the coating composition prepared employing the procedures set forth in this Example had a Bayer number of about 7.4.

Example 12A

A) 188.9 grams of tetraethyl orthosilicate were added to a mixture of 212 grams of deionized water, 86.7 grams of propylene glycol methyl ether and 11.8 grams of itaconic acid and the resulting mixture was stirred for 18 hours and stored at 50° C.

B) 476.8 grams of 3-glycidoxypropyltrimethoxysilane were added to 273.7 grams of deionized water and the resulting mixture was stirred for 18 hours and stored at 5° C.

C) 67.4 grams of the mixture produced in step B above were added to 250 grams of mixture produced in step A above to produce a coating composition. The coating composition was stirred for 24 hours.

The coating composition was applied to the etched ADC lenses according to Procedure A to provide a cured coating having a thickness of about 1.3 micron. The coated lenses were then subjected to the modified Oscillating Sand Test method hereinbefore described and it was determined that the etched ADC lenses coated with the coating composition prepared employing the procedures set forth in this Example had a Bayer number of about 9.3.

Example 12B 10.34 ml of an aqueous 0.105 molar sodium hydroxide solution were added to 250 grams of mixture A from Example 12A above to a final pH of 3.4. The mixture was stirred for 18 hours. 67.4 grams of mixture B (Example 12A) were then added to this mixture to produce an admixture. The admixture was stirred for 24 hours. A 163.9 gram aliquot of the admixture was then diluted with 37.3 grams of propylene glycol methyl ether to produce a coating composition.

The coating composition was applied to the etched ADC lenses according to Procedure A to provide a cured coating having a thickness of about 2.4 microns. The coated lenses were then subjected to the modified Oscillating Sand Test method hereinbefore described and it was determined that the etched ADC lenses coated with the coating composition prepared employing the procedures set forth in this Example had a Bayer number of about 13.9.

Example 12C 1312.1 grams of tetraethyl orthosilicate were added to a mixture of 82.1 grams of itaconic acid, 639.1 grams of water, and 1005 grams of propylene glycol methyl ether to make an aqueous-organic solvent mixture. This mixture was stirred for 18 hours. 115.4 grams of mixture B in example 12A above were added to 364.6 grams of the aqueous-organic solvent mixture. The mixture was stirred for 18 hours to produce a coating composition.

The coating composition was applied to the etched ADC lenses according to Procedure A to provide a cured coating. The coated lenses were then subjected to the modified Oscillating Sand Test method hereinbefore described and it was determined that the etched ADC lenses coated with the coating composition prepared employing the procedures set forth in this Example had a Bayer number of about 8.7.

Example 12D

Benzyldimethylamine was added dropwise to the coating composition described in Example 12C to yield a coating composition with a pH value of 4.2.

The coating composition was applied to the etched ADC lenses according to Procedure A to provide a cured coating having a thickness of about 1.8 microns. The coated lenses were then subjected to the modified Oscillating Sand Test method hereinbefore described and it was determined that the etched ADC lenses coated with the coating composition prepared employing the procedures set forth in this Example had a Bayer number of about 10.1.

Example 12E 1 molar aqueous sodium hydroxide solution was added dropwise to the coating composition described in Example 12C to yield a coating composition with a pH value of 3.6.

The coating composition was applied to the etched ADC lenses according to Procedure A to provide a cured coating having a thickness of about 1.7 microns. The coated lenses were then subjected to the modified Oscillating Sand Test method hereinbefore described and it was determined that the etched ADC lenses coated with the coating composition prepared employing the procedures set forth in this Example had a Bayer number of about 10.3.

Examples 12D–12E illustrate the use of a catalyst with the fully formulated coating of Example 12C.

Example 13

Following the procedure described in Example 1, 61.4 grams of 3-glycidoxypropyltrimethoxysilane, 96.4 grams of water, 88.7 grams of propylene glycol methyl ether, 9.2 grams of itaconic acid and 128.3 grams of tetraethyl orthosilicate were combined in an admixture. To this admixture, 13 grams of Nalco 1115 colloidal silica were added by pouring and stirred overnight to produce a coating composition.

The coating composition was applied to the etched ADC lenses according to Procedure A to provide a cured coating having a thickness of about 1.9 microns. The coated lenses were then subjected to the modified Oscillating Sand Test method hereinbefore described and it was determined that the etched ADC lenses coated with the coating composition prepared employing the procedures set forth in this Example had a Bayer number of about 9.8.

Example 14

Following the procedure described in Example 1, 61.9 grams of 3-glycidoxypropyltrimethoxysilane, 87.2 grams of water, 87.1 grams of propylene glycol methyl ether, 9.3 grams of itaconic acid and 116.1 grams of tetraethyl orthosilicate were combined in an admixture. To this admixture, 38.7 grams of Nalco 1115 colloidal silica were added by pouring and stirred overnight to produce a coating composition.

The coating composition was applied to the etched ADC lenses according to Procedure A to provide a cured coating having a thickness of about 2.0 microns. The coated lenses were then subjected to the modified Oscillating Sand Test method hereinbefore described and it was determined that the etched ADC lenses coated with the coating composition prepared employing the procedures set forth in this Example had a Bayer number of about 12.6.

Example 15

Following the procedure outlined in Example 1, 61.2 grams of 3-glycidoxypropyltrimethoxysilane, 75.8 grams of water, 83.7 grams of propylene glycol methyl ether, 9.2 grams of itaconic acid and 101 grams of tetraethyl orthosilicate were combined in an admixture. To this admixture, 64.7 grams of Nalco 1115 colloidal silica were added by pouring and stirred overnight to produce a coating composition.

The coating composition was applied to the etched ADC lenses according to Procedure A to provide a cured coating having a thickness of about 2.1 microns. The coated lenses were then subjected to the modified Oscillating Sand Test method hereinbefore described and it was determined that the etched ADC lenses coated with the coating composition prepared employing the procedures set forth in this Example had a Bayer number of about 11.

Example 16

17.4 grams of itaconic acid, 106 grams of water and 225.9 grams of propylene glycol methyl ether were combined to form a mixture. 223.3 grams of tetraethyl orthosilicate were added dropwise to the mixture while stirring to produce a first admixture. The first admixture was then stirred for approximately two hours. 61.4 grams of Nalco 1115 colloidal silica were rapidly added by pouring to produce a second admixture. The second admixture was then stirred for about 15 minutes and 116 grams of 3-glycidoxypropyltrimethoxysilane were added dropwise to provide a resulting third admixture which was stirred approximately 14 hours. 0.06 grams of a silicone leveling agent (PA-57) in 0.5 grams of propylene glycol methyl ether were added to produce a coating composition.

The coating composition was applied to the etched ADC lenses according to Procedure A to provide a cured coating. The coated lenses were then subjected to the modified Oscillating Sand Test method hereinbefore described and it was determined that the etched ADC lenses coated with the coating composition prepared employing the procedures set forth in this Example had a Bayer number of about 11.6.

Example 17

153.1 grams of 3-glycidoxypropyltrimethoxysilane were added slowly to 181.1 grams of Nalco 1115 colloidal silica, 100.5 grams of water and 5 grams of itaconic acid which were being stirred constantly. The aqueous 3-glycidoxypropyltrimethoxysilane mixture was then stirred for one hour. 324.4 grams of propylene glycol methyl ether and an additional 16 grams of itaconic acid were added. 220 grams of tetraethyl orthosilicate were then added to the mixture, followed by another 50 grams of propylene glycol methyl ether and then stirred overnight to produce a coating composition.

The coating composition was applied to the etched ADC lenses according to Procedure A to provide a cured coating having a thickness of about 2.4 microns. The coated lenses were then subjected to the modified Oscillating Sand Test method hereinbefore described and it was determined that the etched ADC lenses coated with the coating composition prepared employing the procedures set forth in this Example had a Bayer number of about 13.6.

Example 18

153.1 grams of 3-glycidoxypropyltrimethoxysilane were added slowly to a mixture of 90.5 grams of Ludox HS-30 colloidal silica, (DuPont Company, Wilmington, Del.) 190 grams of water and 5 grams of itaconic acid which was being constantly stirred. The 3-glycidoxypropyltrimethoxysilane mixture was then stirred for approximately two hours. 325.4 grams of propylene glycol methyl ether and an additional 16 grams of itaconic acid were then added to the 3-glycidoxypropyltrimethoxysilane mixture and stirred for an additional hour to produce an admixture. 110 grams of tetraethyl orthosilicate were slowly added to a 390 gram aliquot of the admixture while the admixture was being constantly stirred. The resulting mixture was stirred overnight to produce a coating composition.

The coating composition was applied to the etched ADC lenses according to Procedure A to provide a cured coating having a thickness of about 2.4 microns. The coated lenses were then subjected to the modified Oscillating Sand Test method hereinbefore described and it was determined that the etched ADC lenses coated with the coating composition prepared employing the procedures set forth in this Example had a Bayer number of about 8.4.

Example 19

132.0 grams of tetraethyl orthosilicate were added to a solution of 12.6 grams of itaconic acid in a mixture of 114.0 grams of isopropanol and 114 grams deionized water. The mixture was stirred for 3 hours. 54.3 grams of Ludox HS-30 colloidal silica were added followed by an additional 80 grams of isopropanol. 91.8 grams of 3-glycidoxypropyltrimethoxysilane were then added to this mixture and stirred for about 18 hours. 75 ppm of a silicon leveling agent (PA-57) were added to produce a coating composition.

The coating composition was applied to the etched ADC lenses according to Procedure A to provide a cured coating having a thickness of about 3.0 microns. The coated lenses were then subjected to the modified Oscillating Sand Test method hereinbefore described and it was determined that the etched ADC lenses coated with the coating composition prepared employing the procedures set forth in this Example had a Bayer number of about 7.9.

Examples 13–19 illustrate the addition of colloidal silica to the compositions of the present invention formulated from an epoxy functional silane, a tetrafunctional silane and a multifunctional compound to produce compositions which, upon curing, have improved abrasive resistance properties.

Examples 16–19 also illustrate the optional use of two different types of basic colloidal silica and possible variations in mixing sequences.

Example 20

18.9 grams of methyltrimethoxysilane were added slowly to 56.3 grams of water which was being constantly stirred. 19.8 grams of 3-glycidoxypropyltrimethoxysilane were then added slowly to this solution and stirred approximately one hour. 4.5 grams of itaconic acid pre-dissolved in 56.3 grams of propylene glycol methyl ether were added to the mixture and stirred for an additional hour. 81.3 grams of tetraethyl orthosilicate were slowly added, stirred an additional two hours and the mixture then allowed to sit at ambient temperature overnight. 1.4 grams of benzyldimethylamine were then added to the resultant product to produce a coating composition.

The coating composition was applied to the etched ADC lenses according to Procedure A to provide a cured coating having a thickness of about 3.4 microns. The coated lenses were then subjected to the modified Oscillating Sand Test method hereinbefore described and it was determined that the etched ADC lenses coated with the coating composition prepared employing the procedures set forth in this Example had a Bayer number of about 10.8.

Example 20 illustrates the addition of a silane additive to the compositions of the present invention formulated from an epoxy functional silane, a tetrafunctional silane, and a multifunctional compound.

Example 21

18.9 grams of methyltrimethoxysilane were added slowly to 33.5 grams of Nalco 1042 colloidal silica which was being constantly stirred. 19.8 grams of 3--glycidoxypropyltrimethoxysilane were then added slowly to this solution and stirred approximately one hour. 4.5 grams of itaconic acid pre-dissolved in 56.3 grams of propylene glycol methyl ether were added to the mixture. This mixture was allowed to stir for an additional hour before slowly adding 40.7 grams of tetraethyl orthosilicate to produce an admixture which was stirred an additional two hours and then allowed to sit at ambient temperature overnight. 1.4 grams of benzyldimethylamine were added to the admixture to produce a coating composition.

The coating composition was applied to the etched ADC lenses according to Procedure A to provide a cured coating having a thickness of about 3.3 microns. The coated lenses were then subjected to the modified Oscillating Sand Test method hereinbefore described and it was determined that the etched ADC lenses coated with the coating composition prepared employing the procedures set forth in this Example had a Bayer number of about 6.6.

Example 22

Following the procedure outlined in Example 21, 16.8 grams of Nalco 1042 colloidal silica, 18.9 grams of methyltrimethoxysilane, 19.8 grams of 3-glycidoxypropyltrimethoxysilane, 4.5 grams of itaconic acid, 56.3 grams of propylene glycol methyl ether, 61.0 grams of tetraethyl orthosilicate and 1.4 grams of benzyldimethylamine were combined to produce a coating composition.

The coating composition was applied to the etched ADC lenses according to Procedure A to provide a cured coating having a thickness of about 3.1 microns. The coated lenses were then subjected to the modified Oscillating Sand Test method hereinbefore described and it was determined that the etched ADC lenses coated with the coating composition prepared employing the procedures set forth in this Example had a Bayer number of about 9.9.

Example 23

37.7 grams of 3-glycidoxypropyltrimethoxysilane were added slowly to 82.1 grams of water which was constantly stirred. The aqueous 3-glycidoxypropyltrimethoxysilane mixture was then stirred for approximately one hour. 5.2 grams of itaconic acid pre-dissolved in 96.6 grams of propylene methyl glycol ether were added to the mixture. The solution was then stirred for an additional two hours before adding 0.54 grams of dimethyldimethoxysilane. This mixture was then stirred for 30 minutes and 77.4 grams of tetraethyl orthosilicate were added to the mixture to produce an admixture, then stirred an additional two hours and allowed to sit at ambient temperature overnight. 0.6 grams of benzyldimethylamine were added to the admixture to produce a coating composition.

The coating composition was applied to the etched ADC lenses according to Procedure A to provide a cured coating having a thickness of about 3.1 microns. The coated lenses were then subjected to the modified Oscillating Sand Test method hereinbefore described and it was determined that the etched ADC lenses coated with the coating composition prepared employing the procedures set forth in this Example had a Bayer number of about 11.5.

Example 24

Following the procedure outlined in Example 23, 37.7 grams of 3-glycidoxypropyltrimethoxysilane, 82.1 grams of water, 5.2 grams of itaconic acid, 96.6 grams of propylene glycol methyl ether, 2.7 grams of dimethyldimethoxysilane, 77.4 grams of tetraethyl orthosilicate and 0.6 grams of benzyldimethylamine were combined to produce a coating composition.

The coating composition was applied to the etched ADC lenses according to Procedure A to provide a cured coating having a thickness of about 2.6 microns. The coated lenses were then subjected to the modified Oscillating Sand Test method hereinbefore described and it was determined that the etched ADC lenses coated with the coating composition prepared employing the procedures set forth in this Example had a Bayer number of about 8.6.

Changes may be made in the construction and the operation of the various components, elements and assemblies described herein and changes may be made in the steps or the sequence of steps of the methods described herein without departing from the spirit and scope of the invention as defined in the following claims.

What is claimed:

1. An article comprising:

a substrate; and a substantially transparent abrasion-resistant coating formed on at least one surface of the substrate, the coating having a Bayer number of at least 5, the coating being formed by curing a coating composition comprising an aqueous-organic solvent mixture applied to the surface of the substrate and wherein the aqueous-organic solvent mixture consisting essentially of:

from about 10 to about 99.9 weight percent, based on the total solids of the composition, of hydrolysis products and partial condensates of an epoxy functional silane and a tetrafunctional silane wherein the epoxy functional silane is present in a molar ratio to the tetrafunctional silane of from about 0.1:1 to about 5:1 and the solvent component of the aqueous solvent dispersion is compatible with the epoxy functional silane and the tetrafunctional silane;

from about 0.1 to about 30 weight percent of a multifunctional compound, based on the total solids of the composition, wherein the multifunctional compound is selected from the group consisting of multifunctional carboxylic acids, multifunctional anhydrides and mixtures thereof; and an amount of water sufficient to hydrolyze the epoxy functional silane and the tetrafunctional silane.

2. The article of claim 1 wherein the epoxy functional silane is present in a molar ratio to the tetrafunctional silane of from about 0.1:1 to about 3:1.

3. The article of claim 1 wherein the solvent constituent of the aqueous-organic solvent mixture is selected from the group consisting of an alcohol, an ether, a glycol, a glycol ether, an ester, a ketone, a glycolether acetate and mixtures thereof.

4. The article of claim 3 wherein the aqueous-organic solvent mixture further includes an effective amount of a catalyst to provide enhanced abrasion resistance to a coating produced by curing the composition.

5. The article of claim 4 wherein the effective amount of the cataylst is from about 0.1 to about 10 weight percent, based on the total solids of the composition.

6. The article of claim 5 wherein the aqueous-organic solvent mixture further includes from about 0.1 to about 50 weight percent, based on the total solids of the composition, of a mixture of hydrolysis products and partial condensates of silane additive represented by the formula $$R^9_x Si(OR^{10})_{4-x}$$

where x is an integer of 1, 2 or 3, $R^9$ is H, an alkyl group containing from 1 to about 10 carbon atoms, a functionalized alkyl group, an alkylene group, an aryl group, an alkyl ether group and combinations thereof, $R^{10}$ is H, an alkyl group containing from 1 to about 10 carbon atoms, an acetyl group and combinations thereof.

7. The article of claim 6 wherein the aqueous-organic solvent mixture further includes:

an effective amount of a leveling agent to spread the aqueous-organic solvent mixture on the substrate and provide substantially uniform contact of the aqueous-organic solvent mixture with the substrate.

8. The article of claim 1 wherein the solvent constituent of the aqueous-organic solvent mixture is an alcohol having the general formula ROH where R is an alkyl group containing from 1 to about 10 carbon atoms.

9. The article of claim 1 wherein the solvent constituent of the aqueous-organic solvent mixture is selected from the group consisting of a glycol, an ether, a glycol ether and mixtures thereof having the formula $R^1$—$(OR^2)_x$—$OR^1$ where x is an integer of 0, 1, 2, 3 or 4, $R^1$ is H or an alkyl group containing from 1 to about 10 carbon atoms and $R^2$ is an alkylene group containing from 1 to about 10 carbon atoms and combinations thereof.

10. The article of claim 1 wherein the epoxy functional silane is represented by the formula $R^3_x Si(OR^4)_{4-x}$ where x is an integer of 1, 2 or 3, $R^3$ is H, an alkyl group, a functionalized alkyl group, an alkylene group, an aryl group, an alkyl ether and combinations thereof containing from 1 to about 10 carbon atoms and having at least 1 epoxy functional group, and $R^4$ is H, an alkyl group containing from 1 to about 5 carbon atoms, an acetyl group, a —Si(OR$^5$)$_{3-y}$R$^6_y$ group where y is an integer of 0, 1, 2, or 3, and combinations thereof where $R^5$ is H, an alkyl group containing from 1 to about 5 carbon atoms, an acetyl group, another —Si(OR$^5$)$_{3-y}$R$^6_y$ group and combinations thereof, and $R^6$ is H, an alkyl group, a functionalized alkyl group, an alkylene group, an aryl group, an alkyl ether and combinations thereof containing from 1 to about 10 carbon atoms.

11. The article of claim 10 wherein the tetrafunctional silane is represented by the formula Si(OR$^7$)$_4$ where $R^7$ is H, an alkyl group containing from 1 to about 5 carbon atoms and ethers thereof, an (OR$^7$) carboxylate, a —Si(OR$^8$)$_3$ group where $R^8$ is a H, an alkyl group containing from 1 to about 5 carbon atoms and ethers thereof, an (OR$^8$) carboxylate, another —Si(OR$^8$)$_3$ group and combinations thereof.

12. The article of claim 11 wherein the solvent constituent of the aqueous-organic solvent mixture is an alcohol having the general formula ROH where R is an alkyl group containing from 1 to about 10 carbon atoms.

13. The article of claim 11 wherein the solvent constituent of the aqueous-organic solvent mixture is selected from the group consisting of a glycol, an ether, a glycol ether and mixtures thereof having the formula $R^1$—$(OR^2)_x$—$OR^1$ where x is an integer of 0, 1, 2, 3 or 4, $R^1$ is H or an alkyl group containing from 1 to about 10 carbon atoms and $R^2$ is an alkylene group containing from 1 to about 10 carbon atoms and combinations thereof.

14. The article of claim 11 wherein the amount of water present in the aqueous-organic solvent dispersion is an amount sufficient to provide a substantially homogeneous mixture of hydrolysis products and partial condensates of the epoxy functional silane and the tetrafunctional silane.

15. The article of claim 1 wherein the tetrafunctional silane is represented by the formula Si(OR$^7$)$_4$ where $R^7$ is H, an alkyl group containing from 1 to about 5 carbon atoms and ethers thereof, an (OR$^7$) carboxylate, a —Si(OR$^8$)$_3$ group where $R^8$ is a H, an alkyl group containing from 1 to about 5 carbon atoms and ethers thereof, an (OR$^8$) carboxylate, another —Si(OR$^8$)$_3$ group and combinations thereof.

16. The article of claim 1 wherein at least a portion of the solvent component of the aqueous-organic solvent mixture is generated during hydrolysis of the epoxy functional silane and the tetrafunctional silane.

17. The article of claim 1 wherein the aqueous-organic solvent mixture further includes: from about 0.1 to about 50 weight percent, based on the total solids of the composition, of a mixture of hydrolysis products and partial condensates of a silane additive represented by the formula $$R^9_x Si(OR^{10})_{4-x}$$

where x is an integer of 1, 2 or 3, $R^9$ is H, an alkyl group containing from 1 to about 10 carbon atoms, a functionalized alkyl group, an alkylene group, an aryl group, an alkyl ether group and combinations thereof, $R^{10}$ is H, an alkyl group containing form 1 to about 10 carbon atoms, an acetyl group and combinations thereof.

18. The article of claim 17 wherein the aqueous-organic solvent mixture further includes:

an effective amount of a leveling agent to spread the aqueous-organic solvent mixture on the substrate and provide substantially uniform contact of the aqueous-organic solvent mixture with the substrate.

19. The article of claim 1 wherein the aqueous-organic solvent mixture further includes:

from about 0.1 to about 50 weight percent, based on the total solids of the composition, of a mixture of hydrolysis products and partial condensates of a silane additive represented by the formula $$R^9_xSi(OR^{10})_{4-x}$$

where x is an integer of 1, 2 or 3, $R^9$ is H, an alkyl group containing from 1 to about 10 carbon atoms, a functionalized alkyl group, an alkylene group, an aryl group, an alkyl ether group and combinations thereof, $R^{10}$ is H, an alkyl group containing from 1 to about 10 carbon atoms, an acetyl group and combinations thereof; and an effective amount of colloidal silica to provide the composition with from about 0.1 to about 50 weight percent silica, based on the total of solids present in the composition.

20. The article of claim 19 wherein the aqueous-organic solvent mixture further includes an effective amount of a catalyst to provide enhanced abrasion resistance to a coating produced by curing the composition.

21. The article of claim 20 wherein the effective amount of the catalyst is from about 0.1 to about 10 weight percent, based on the total solids of the composition.

22. The article of claim 21 wherein the aqueous-organic solvent mixture further includes:

an effective amount of a leveling agent to spread the aqueous-organic solvent mixture on the substrate and provide substantially uniform contact of the aqueous-organic solvent mixture with the substrate.

23. The article of claim 1 wherein the aqueous-organic solvent mixture further includes:

an effective amount of colloidal silica to provide the composition with from about 0.1 to about 50 weight percent silica, based on the total of solids present in the composition.

24. The article of claim 23 wherein the aqueous-organic solvent mixture further includes:

an effective amount of a leveling agent to spread the aqueous-organic solvent mixture on the substrate and provide substantially uniform contact of the aqueous-organic solvent mixture with the substrate.

25. The article of claim 24 wherein the amount of water present in the aqueous-organic solvent mixture is an amount sufficient to provide a substantially homogeneous mixture of hydrolysis products and partial condensates of the epoxy functional silane and the tetrafunctional silane.

26. The article of claim 25 wherein the aqueous-organic solvent mixture further includes an effective amount of a catalyst to provide enhanced abrasion resistance to the coating produced by curing the aqueous solvent mixture.

27. The article of claim 26 wherein the effective amount of catalyst present in the aqueous-organic solvent mixture is from about 0.1 to about 10 weight percent, based on the total solids of the aqueous-organic solvent mixture.

28. The article of claim 26 wherein the aqueous-organic solvent mixture further includes from about 0.1 to about 50 weight percent, based on the total of solids of the aqueous-organic solvent mixture, of a mixture of hydrolysis products and partial condensates of a silane additive represented by the formula $$R^9_xSi(OR^{10})_{4-x}$$

where x is an integer of 1, 2 or 3, $R^9$ is H, an alkyl group containing from 1 to about 10 carbon atoms, a functionalized alkyl group, an alkylene group, an aryl group, an alkyl ether group and combinations thereof, $R^{10}$ is H, an alkyl group containing from 1 to about 10 carbon atoms, an acetyl group and combinations thereof.

29. The article of claim 1 wherein the aqueous-organic solvent mixture further includes:

an effective amount of a leveling agent to spread the aqueous-organic solvent mixture on the substrate and provide substantially uniform contact of the aqueous-organic solvent mixture with the substrate.

30. The article of claim 1 wherein the substrate is formed of plastic, wood, ceramic, glass ceramic, glass, mineral based, leather, paper, textile and metal materials.

31. An article comprising:

a substrate; and a substantially transparent abrasion-resistant coating formed on at least one surface of the substrate, the coating having a Bayer number of at least 5, the coating being formed by curing a coating composition comprising an aqueous-organic solvent mixture applied to the surface of the substrate, the aqueous-organic solvent mixture consisting essentially of:

hydrolysis products and partial condensates of an epoxy functional silane, a tetrafunctional silane and a multifunctional compound, wherein the multifunctional compound is selected from the group consisting of multifunctional carboxylic acids, multifunctional anhydrides and combinations thereof and wherein the epoxy functional silane is present in a molar ratio to the tetrafunctional silane of from 0.1:1 to about 5:1; and an amount of water sufficient to hydrolyze the epoxy functional silane and the tetrafunctional silane.

* * * * *

UNITED STATES PATENT AND TRADEMARK OFFICE
CERTIFICATE OF CORRECTION

PATENT NO. : 6,346,331 B2
DATED : October 26, 2005
INVENTOR(S) : Janet L. Harvey et al.

It is certified that error appears in the above-identified patent and that said Letters Patent is hereby corrected as shown below:

Title page,
Item [57], ABSTRACT,
Line 1, after "improved" change "sability" to -- stability --.

Column 6,
Line 5, after "an" change "$OR^3$" to -- $OR^8$ --.
Line 29, after "tetrafunctional" change "silans" to -- silane --.

Column 7,
Line 56, after "silanes," delete "and mixtures thereof. --.
Line 61, after "group" add a comma.

Column 12,
Line 12, after "invention" add a period.

Column 24,
Line 56, after "containing" change "form" to -- from --.

Signed and Sealed this

Third Day of January, 2006

JON W. DUDAS
*Director of the United States Patent and Trademark Office*